(No Model.) 2 Sheets—Sheet 2.
W. S. AUNGST.
HOSE HOLDER OR SUPPORT.
No. 596,689. Patented Jan. 4, 1898.
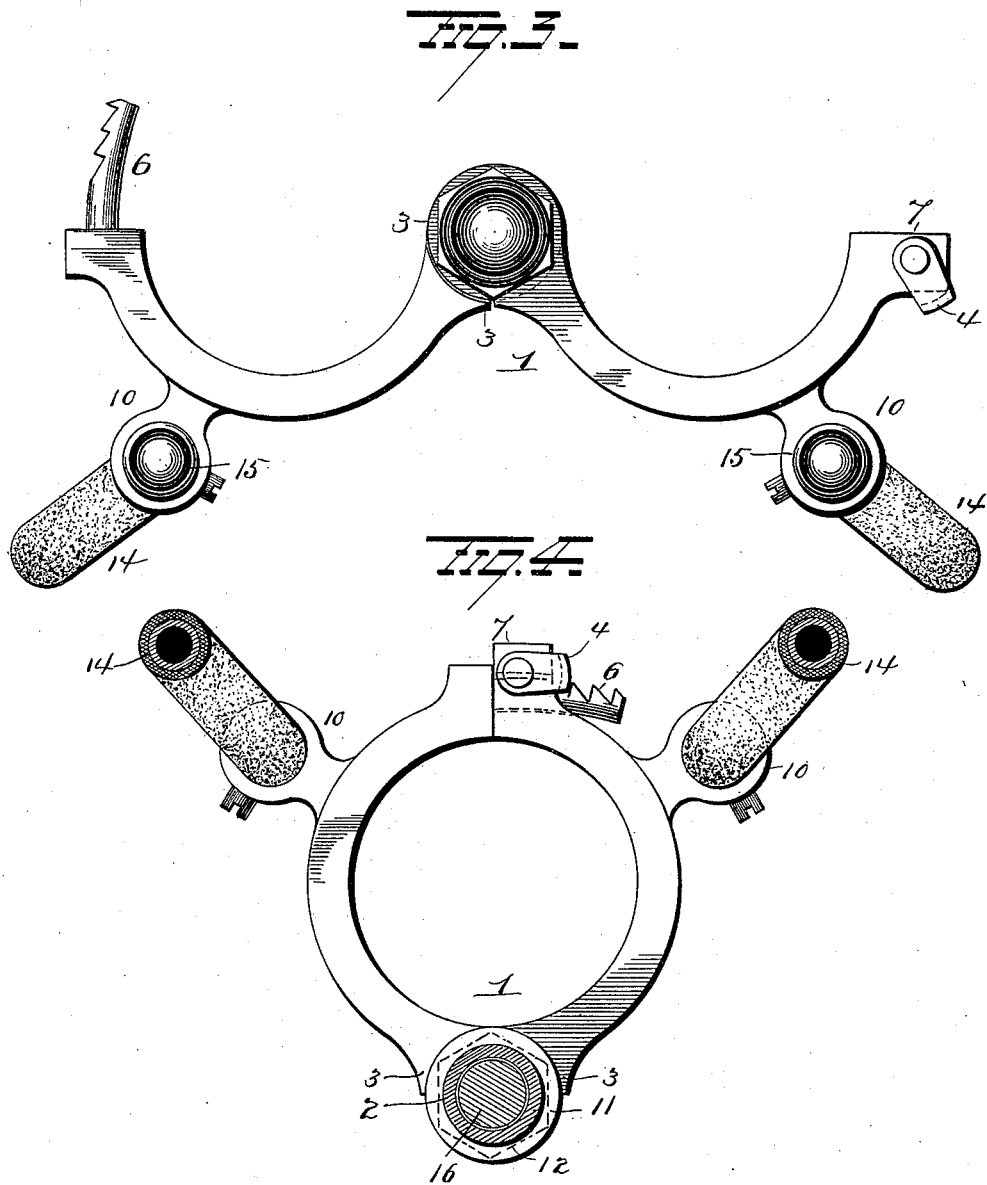

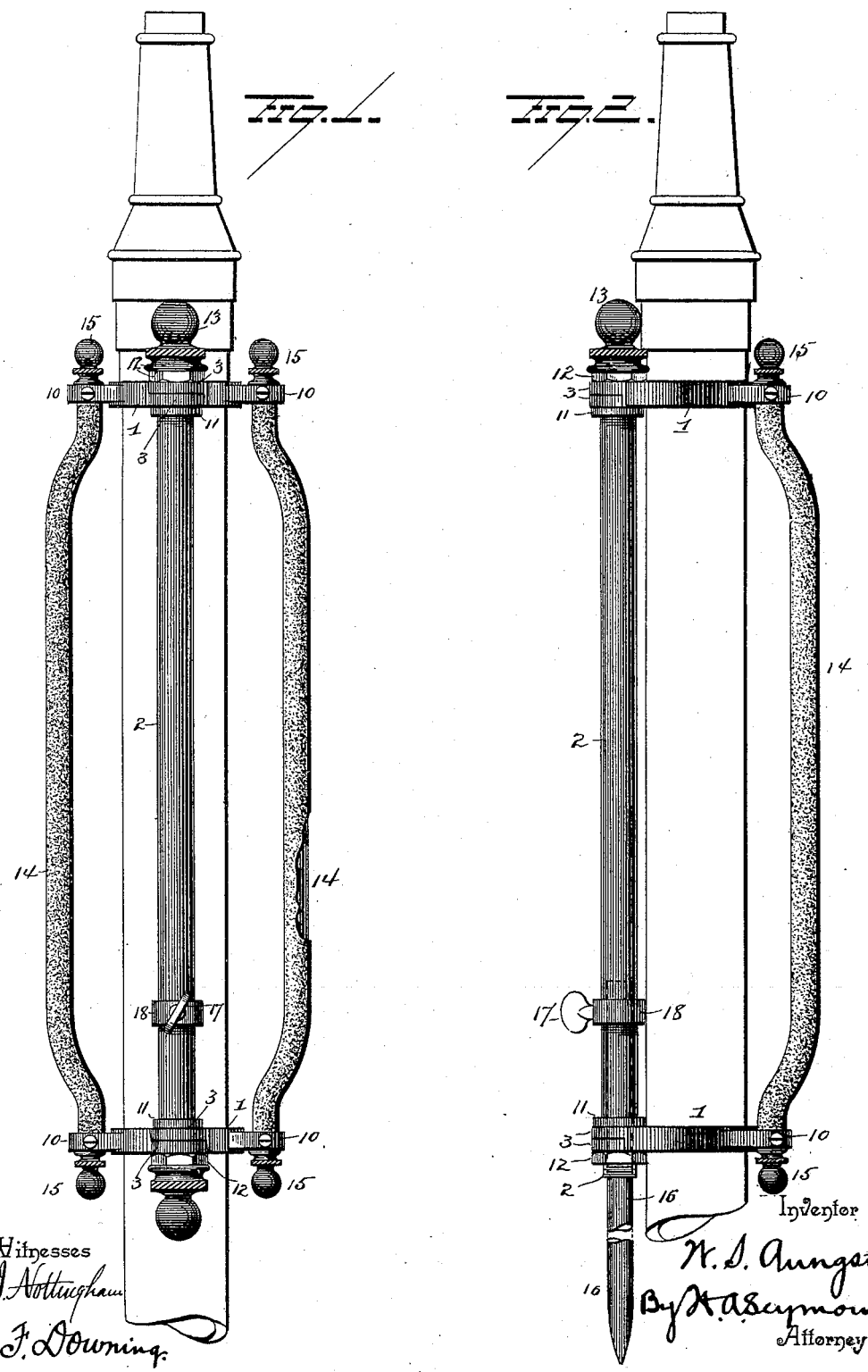

UNITED STATES PATENT OFFICE.

WILLIAM S. AUNGST, OF ALLIANCE, OHIO.

HOSE HOLDER OR SUPPORT.

SPECIFICATION forming part of Letters Patent No. 596,689, dated January 4, 1898.

Application filed March 23, 1897. Serial No. 628,878. (No model.)

*To all whom it may concern:*

Be it known that I, WILLIAM S. AUNGST, a resident of Alliance, in the county of Stark and State of Ohio, have invented certain new and useful Improvements in Hose Holders or Supports; and I do hereby declare the following to be a full, clear, and exact description of the invention, such as will enable others skilled in the art to which it appertains to make and use the same.

My invention relates to an improvement in hose holders or supports, the object being to provide a device adapted to be removably secured to the regulation size fire-hose and provided with handles whereby the nozzle can be manipulated by one or two men and with a support for sustaining the major portion of the weight and thrust of the nozzle.

My invention consists in the parts and combinations of parts, as will be more fully described, and pointed out in the claims.

In the accompanying drawings, Figure 1 is a view showing my improvement applied to a hose. Fig. 2 is a similar view showing the supporting-rod in its operative position. Fig. 3 is a view of the device detached and opened for the reception of a hose, and Fig. 4 is a similar view showing the device closed.

My device consists, primarily, of two rings 1, each of which is made of sections adapted to be secured together and pivotally mounted on the tube 2. The sections comprising the rings are semicircular in form, and the two sections of each ring are each provided with overlapping ends 3, through which the tube passes, forming a hinge-joint and permitting the sections to be opened or separated for the introduction of a hose. The free ends of the two sections of each ring abut when the sections are closed around a hose and are locked against separation by the bail 4, attached to one section of the ring and engaging a projecting toothed finger 6, adapted to pass through an opening formed in the enlarged end 7 of the other section and be held by a spring-catch or by a thumb-screw. With either of these constructions, where there is a chance for adjustment, the collars or rings can be clamped around hose of varying sectional areas.

The four sections constituting the two rings are each provided at a point near the free end thereof with the integral laterally-projecting perforated lug 10.

The sections of the two rings are connected together, and the rings are held a predetermined distance apart by the tube 2. The overlapping ends of the rings are passed onto the tube at the ends of the latter until they engage the collars 11, after which they are locked in place by the nuts 12, screwed onto the screw-threaded end of the tube, after which the ends of the tubes are closed by the ornamental caps 13. This tube connects the sections of each ring and also connects the two rings.

14 are handles, preferably rods or tubing, bent, as shown, to permit of the ready introduction of the hands between it and the hose and covered with rubber. These rods are provided with screw-threaded ends adapted to pass through the perforations in lugs 10 and are secured in place by the combined nuts and ornamental caps 15, secured to the ends of the rods. From this it will be seen that each rod or handle 14 connects a section of both rings, and the two handles, rings, and tube form a frame adapted to be applied to any hose and form a convenient and reliable support therefor and render the manipulation of the nozzle thereof by one or two men comparatively easy. This frame or support is usually applied to the hose just behind the nozzle thereof and is of sufficient length to support in a rigid manner that portion of the hose adjacent to the nozzle. Hence when the holder is applied and the bars or handles thereof grasped by one or two men the support and nozzle are practically rigid, are more readily and easily handled, and better control of the stream secured.

To assist in supporting the weight of the hose and the nozzle, so that the dead-weight thereof will not have to be borne by the pipemen, I have provided the tube 2 with a rod 16, which latter is adapted to slide within the tube and be retained therein by the caps on the end of the latter. By the removal of the lower cap this rod 16 can be slid outwardly and locked by the thumb-screw 17, which latter passes through the strengthening-collar 18 and the tube 2 and engages the rod. The lower end of the rod can rest on the ground and sustain the greater portion of the weight of the hose, nozzle, and water, thus leaving the pipeman practically free of the weight and permitting him to manipulate the nozzle with ease.

The support can be readily attached to any hose of approximately the regulation size and after use can be removed therefrom and placed in the wagon or carriage convenient for use at the next call, or it can be kept on the hose ready for use.

It is evident that many slight changes might be resorted to in the relative arrangement of parts herein described without departing from the spirit and scope of my invention. Hence I would have it understood that I do not limit myself to the exact construction and arrangement of parts herein described and shown; but, Having fully described my invention, what I claim as new, and desire to secure by Letters Patent, is—

1. A support for hose consisting of two rings each made in sections hinged together, means for locking the free ends of the sections together and handles connecting the two rings.

2. A support for hose consisting of rings each made in two parts, a tube to which the parts of the two rings are hinged, means for locking the sections constituting a ring and handles connecting the rings.

3. A support for hose comprising a tube, a sliding rod within the tube, a clamp for locking the rod when in its extended position to the tube, sectional rings mounted on the tube and handles connecting the rings.

4. A support for hose comprising a tube, a sliding rod within the tube, a clamp for locking the rod when in its extended position to the tube, sectional rings mounted on the tube, means for holding the ring-sections in closed position and handles connecting the rings, substantially as set forth.

In testimony whereof I have signed this specification in the presence of two subscribing witnesses.

WILLIAM S. AUNGST.

Witnesses:
THOS. R. JONES,
J. H. MCCONNELL.